US011269842B2

(12) United States Patent
Sun et al.

(10) Patent No.: US 11,269,842 B2
(45) Date of Patent: Mar. 8, 2022

(54) DATA STORAGE LAYER INDEX FOR EFFICIENT INFORMATION RETRIEVAL

(71) Applicant: Accenture Global Solutions Limited, Dublin (IE)

(72) Inventors: Guanyi Sun, Beijing (CN); Bin Xie, Beijing (CN); Guo Ma, Beijing (CN)

(73) Assignee: Accenture Global Solutions Limited, Dublin (IE)

( * ) Notice: Subject to any disclaimer, the term of this patent is extended or adjusted under 35 U.S.C. 154(b) by 357 days.

(21) Appl. No.: 16/608,979

(22) PCT Filed: May 9, 2017

(86) PCT No.: PCT/CN2017/083597
§ 371 (c)(1),
(2) Date: Oct. 28, 2019

(87) PCT Pub. No.: WO2018/205137
PCT Pub. Date: Nov. 15, 2018

(65) Prior Publication Data
US 2020/0050595 A1    Feb. 13, 2020

(51) Int. Cl.
*G06F 16/22* (2019.01)
*G06F 16/23* (2019.01)
*H04L 9/06* (2006.01)

(52) U.S. Cl.
CPC ...... *G06F 16/2272* (2019.01); *G06F 16/2379* (2019.01); *H04L 9/0637* (2013.01); *H04L 2209/38* (2013.01)

(58) Field of Classification Search
CPC . G06F 16/2272; G06F 16/2379; H04L 9/0637
See application file for complete search history.

(56) References Cited

U.S. PATENT DOCUMENTS

| | | | |
|---|---|---|---|
| 9,390,116 B1 * | 7/2016 | Li | G06F 16/2272 |
| 9,569,477 B1 * | 2/2017 | McSweeney | G06F 16/24532 |
| 9,608,829 B2 | 3/2017 | Spanos et al. | |
| 10,013,440 B1 * | 7/2018 | Gupta | G06F 16/2246 |
| 10,860,562 B1 * | 12/2020 | Gupta | G06F 16/2453 |
| 11,080,253 B1 * | 8/2021 | Leshinsky | G06F 3/0611 |

(Continued)

FOREIGN PATENT DOCUMENTS

CN        106330431 A        1/2017

OTHER PUBLICATIONS

International Search Report and Written Opinion of the International Search Authority dated Feb. 13, 2018 in International Application No. PCT/CN2017/083597 (English language) (7 pp.).

*Primary Examiner* — Huawen A Peng
(74) *Attorney, Agent, or Firm* — Crowell & Moring LLP (57) ABSTRACT

A secure data system facilitates efficient searching of extensive data storage layers, e.g., a blockchain. The system may create an index for data elements of a predefined type recorded in the blockchain. The system may generate the index by invoking executable instructions stored in an executable data element (e.g., a smart contract) recorded in the blockchain and associated with the predefined type of data elements. The index facilitates fast query into the blockchain for the data elements of the predefined type.

20 Claims, 9 Drawing Sheets

(56) References Cited

U.S. PATENT DOCUMENTS

| | | | |
|---|---|---|---|
| 2014/0136510 A1* | 5/2014 | Parkkinen | G06F 16/2272 707/711 |
| 2014/0324804 A1* | 10/2014 | Chang | G06F 16/13 707/696 |
| 2016/0321654 A1 | 11/2016 | Lesavich et al. | |
| 2017/0315875 A1* | 11/2017 | Tirupati Nagaraj | G06F 16/2272 |
| 2017/0337229 A1* | 11/2017 | Infante Suarez | G06F 16/2246 |
| 2018/0060367 A1* | 3/2018 | Ioannou | G06F 16/2272 |
| 2019/0138642 A1* | 5/2019 | Pal | G06F 16/27 |

* cited by examiner

DATA STORAGE LAYER INDEX FOR EFFICIENT INFORMATION RETRIEVAL

CROSS-REFERENCE TO RELATED APPLICATION

This application is the U.S. National Stage of International Application No. PCT/CN2017/083597, filed on May 9, 2017.

TECHNICAL FIELD

This disclosure relates to secure data systems, and to more efficiently locating data elements in secure data storage layers, such as blockchains.

BACKGROUND

Rapid advances in electronics and communication technologies, driven by immense customer demand, have resulted in a widespread adoption of secure data systems that employ cryptographically secure data storage layers, e.g., blockchains. Among many practical applications, a blockchain facilitates information sharing. Improvements in the efficiency of locating and retrieving data in extensive data storage layers will help drive the further adoption of such secure data systems.

DETAILED DESCRIPTION

Data elements describing relationship between entities, such as data related to exchange in money or services, are traditionally maintained and processed by a third party such as a bank. The integrity of the data elements thus relies on the trustworthiness of the third party and how these data elements are secured from tampering in, e.g., servers controlled by the third party. Various data storage layers (e.g., blockchain systems) have been developed recently to decentralize the processing and storage of these data elements among a large group of non-trusted nodes. The description below refers to blockchain as an example implementation context, but the technical solutions are applicable to other data storage layers.

Blockchain system remove the need for a trusted third party. In a blockchain system, data elements are stored as publicly accessible data units in the form of a chain of data blocks (i.e., a blockchain) having multiple copies distributed to various blockchain nodes. The data integrity in the blockchain system is achieved using digital signature, a consensus mechanism, and other data tampering resistant algorithms. A blockchain storing these data elements, however, may be organizes using principles distinct from, for example, traditional relational or non-relational databases. Unlike these traditional databases designed for fast information retrieval, a direct information query into the blockchain may be an inefficient and time-consuming process that involves traversing the entire chain of data blocks. In this disclosure, auxiliary indexes integrated with the blockchain system provide a technical solution for fast information search and retrieval from the data storage layers, including blockchains.

Figure 1:
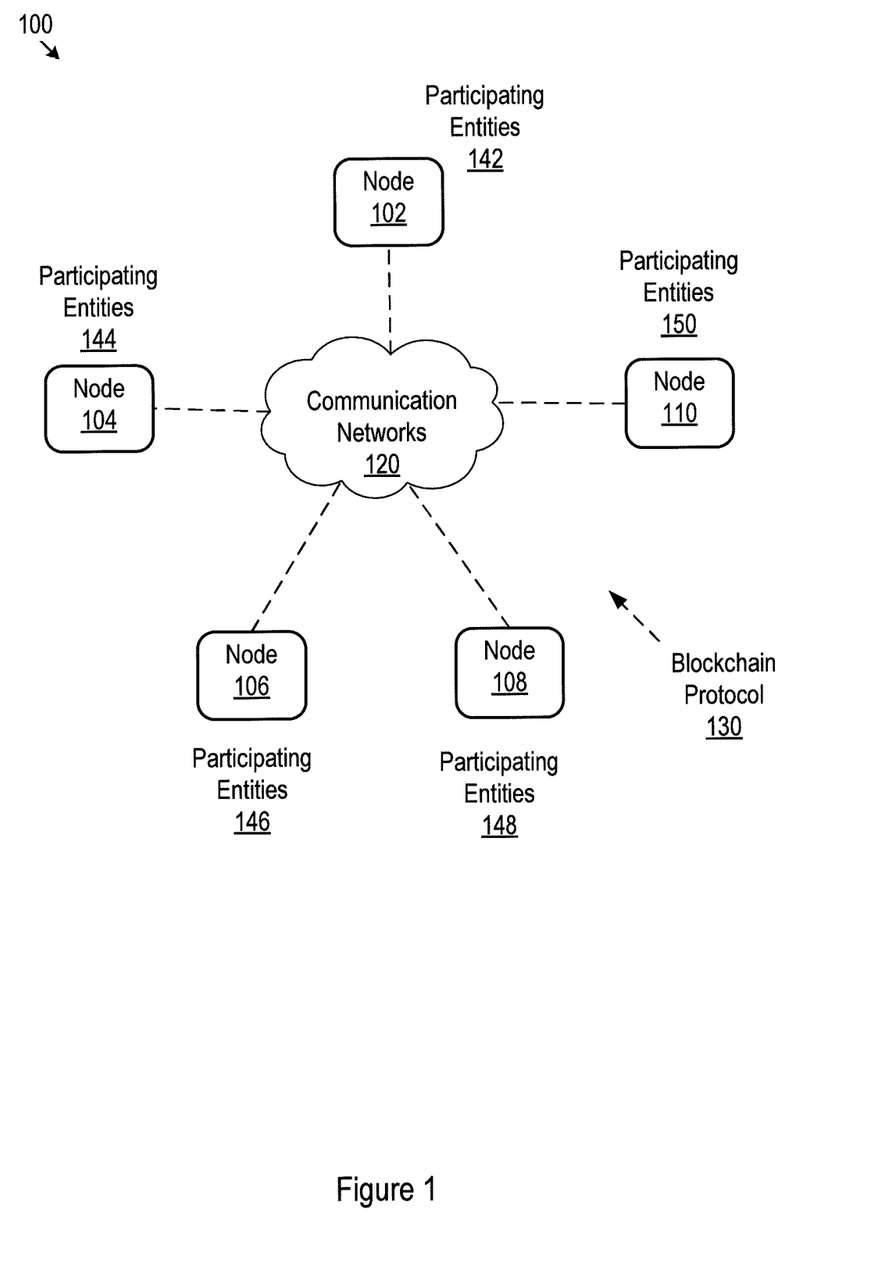
FIG. 1 illustrates an example secure decentralized data processing and storage system.

FIG. 1 illustrates an example system 100 for secure and decentralized data processing and storage, such as a blockchain platform. The system 100 includes decentralized nodes 102, 104, 106, 108, and 110 in communication with each other via a communication network 120. The communication network 120 may be based on, for example, the Internet Protocol (IP), and may include a combination of wired or wireless access networks, local area networks, wide area networks, and other computer networks.

Each node of the system 100 may be a combination of software and hardware for, e.g., storing, maintaining, updating, processing, and querying the secured data (referred to as the blockchain below). Each node may be based on a single computer, a group of centralized or distributed computers, or a single or a group of virtual machines hosed by a cloud computing service provider.

Figure 2:
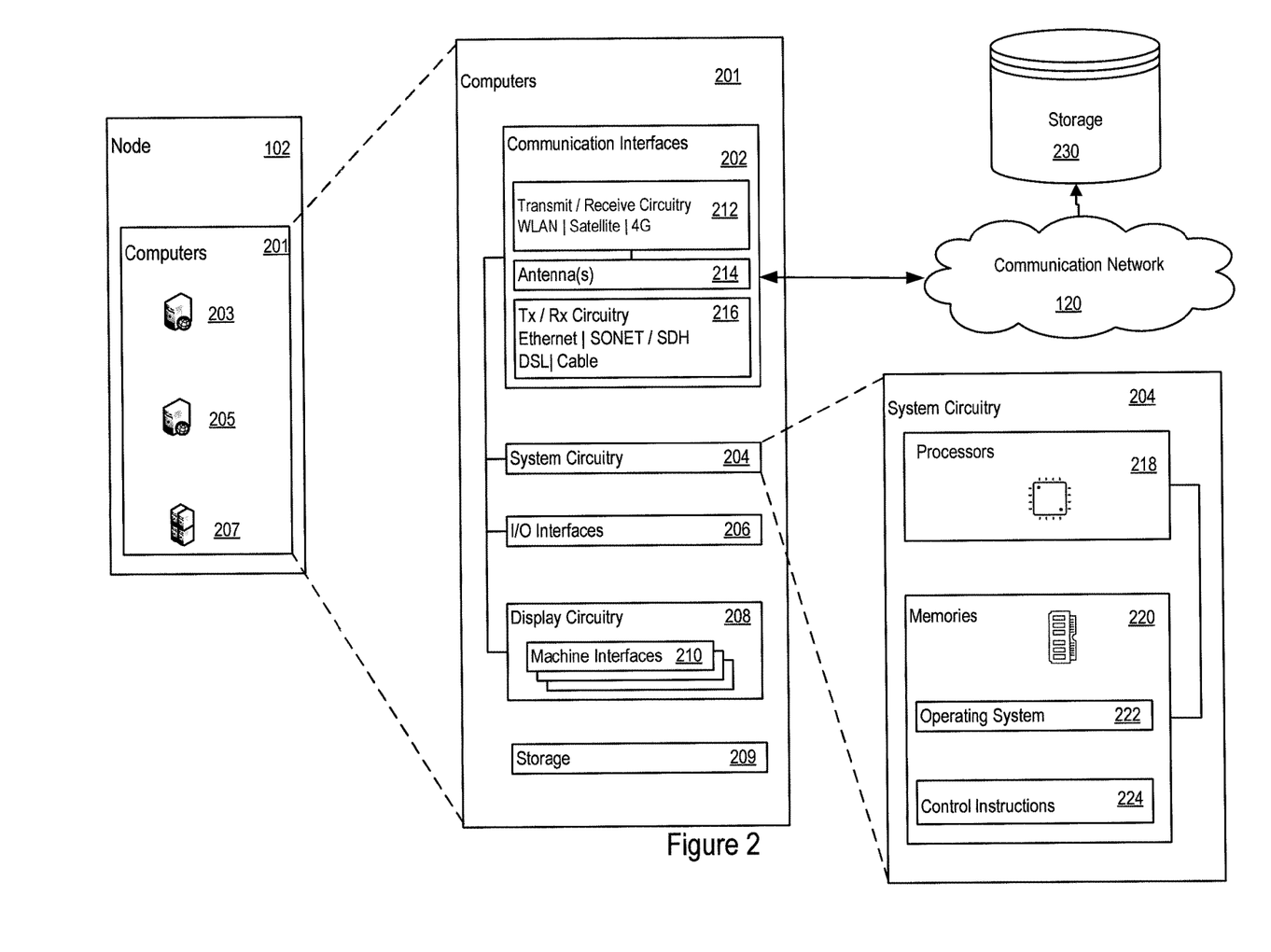
FIG. 2 shows an example of a secure data processing and storage node of FIG. 1.

As an example, in FIG. 2, a node of the secure data processing and storage system 100, such as the node 102, is shown as including a group of computers 201, such as computers 203, 205, and 207. Computers 201 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol. The computers 201 of node 102 communicate with other nodes of the blockchain system 100 via the communication interface 202 and the communication network 120.

The storage 209 may be used to store locally a copy of the blockchain for the node 102. The storage 209 may be further used to store the auxiliary indexes of the blockchain. Alternatively, the computers 201 may be in communication via the communication interfaces 202 and the communication network 120 with a network storage 230 for storing a copy of the blockchain. The network storage 230 may be centralized or distributed. For example, the network storage 230 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 may include an injection circuitry interacting with the blockchain and other parts of the system 100 for the implementation of any desired functionality related to the maintenance, storage, processing, verification, indexing, and other aspects of the blockchain. As just one example, the system circuitry 204 may include one or more instruction processors 218 and memories 220. The memory 220 stores, for example, control instructions 224 and an operating system 222. In one implementation, the processor 218 executes the control instructions 224 and the operating system 222 to carry out any desired functionality related to the blockchain. The control instruction 224 for the blockchain may be implemented as a software stack having multiple layers.

Returning to FIG. 1, entities 142, 144, 146, 148, and 150 may participate in the blockchain system 100 via the blockchain nodes of FIG. 1. In one implementation, each node of the blockchain system 100 may support one participating entity. In another implementation, each node may support multiple participating entities or multiple users of a participating entity. To become a node of the system 100, computers at the node may be installed with the blockchain software stack. On the top of the software stack, an application layer may provide various blockchain functions, supported by the lower layers of the software stack. These functions may include, for example, encrypting data elements, submitting data elements for insertion into the blockchain, verifying data elements to be submitted, creating new data blocks in the blockchain via a consensus mechanism, storing a local copy of the blockchain, and other functions.

The configuration and functioning of the blockchain system 100 may be governed by a blockchain protocol 130, as shown in FIG. 1. The blockchain protocol 130 may define how data elements are encrypted by the participating entities. The blockchain protocol 130 may further specify the format of the encrypted data elements such that the encrypted data elements may be decrypted and understood by the participating entities and nodes in the blockchain system. The blockchain protocol 130 may additional specify the types of functions discussed above and how these functions should be carried out. The blockchain protocol 130 may additionally specify possible roles of a participating entity and node. For example, a blockchain node may participate as a full function node, capable of performing all blockchain functions. Alternatively, a blockchain node may only participate to perform one of subsets of the blockchain function. Each subset of block functions may be contain a number of blockchain functions from the blockchain functions available. The possible subsets of blockchain functions may be specified in the blockchain protocol 130. A participating entity may choose one of the subsets and install a corresponding software stack for performing the functions included in the chosen subset. In another implementation, the blockchain protocol 130 may allow a participating entity to choose any combination of functions and configure its node accordingly rather than following one of the prescribed subsets by the blockchain protocol 130.

Figure 3:
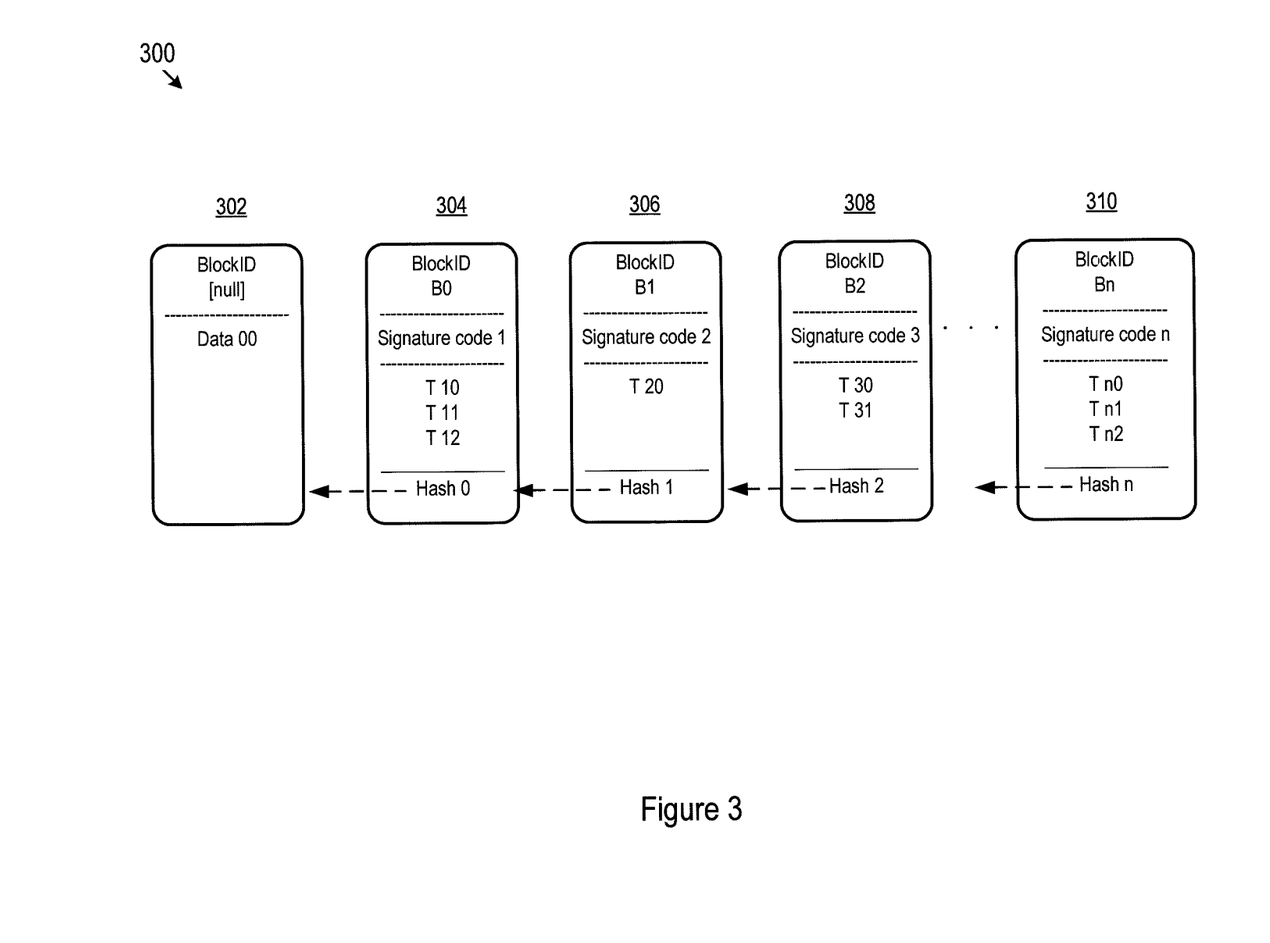
FIG. 3 illustrates a blockchain stored in the nodes of FIG. 1.

FIG. 3 shows an example copy of the blockchain, 300, stored in a node of the blockchain system 100 having the function of storing a local copy of the blockchain. As shown in FIG. 3, the copy of the blockchain may include a series of linked data blocks 302, 304, 306, 308, and 310, each uniquely identified by a block ID (B0, B1, B2, and Bn). Each of the data blocks may include multiple data elements, such as T10, T11, and T12 of Block 304, . . . , and Tn0, Tn1, and Tn2 of block 310. Each data element may include a data ID in addition to the data. Block 302 may be a special data block that functions as the head of the blockchain, or a genesis block, and may not contain actual data elements. A data element in a data block may include any type of data that a participating entity wish to store in the blockchain. A data element, for example, may be of a type that describe a relationship between entities, e.g., a monetary or service transaction between two parties. As another example, a data element may include computer instructions for automatically executing provisions of an agreement or contract embedded in the computer instructions and between entities. Data elements stored in the blockchain and of this type may be referred to as executable data elements or smart contracts. As described in more detail below, execution of one or more segments of the computer instructions in an executable data element may be invoked by and from other data elements in the blockchain.

Authenticity of the data elements in each data block may be achieved using various cryptographic technologies. For example, digital signature based on public and private key cryptography may be used to ensure that a data element to be inserted into the blockchain indeed comes from its proclaimed submitting entity. In particular, each entity participating in the blockchain system and who wishes to store data elements in the blockchain may be in possession of a private key that is kept secret at all times. A public key may be derived from the private key and may be made publicly available. When the entity wishes to store a data element in the blockchain, the entity may first encrypt the data element using the private key before the data is submitted for insertion in the blockchain. The encrypted data element may be decrypted by anyone having access to the public key of the entity. Any tampering of the encrypted data will results in unreadable data when decrypted using the public key. As such, encryption using the private key represents a digital signature of the data element by the entity and any tampering of the encrypted data is easily detected.

Data blocks 302, 304, 306, 308, and 310 of the blockchain 300 are sequentially created and are linked into a chain. In one example implementation, and as shown in FIG. 3, the linkage between a data block and its immediately previous data block may be a hash value rather than a traditional pointer in a data structure. In particular, a data block may be linked to its immediate previous data block by including a hash value, referred here in as a linkage hash value, of the data elements in the immediately previous block. In FIG. 3, for example, the hash value of data elements in block 304, Hash 1, may be included in data block 306 immediately following block 304 as a linkage hash value. As such, data block 306 is linked with data block 304. The algorithm used for calculating the hash value of the data elements contained in a block, for example, may be based on but is not limited to SHA256 hashing.

As shown in FIG. 3, each data block of the blockchain system containing data elements may further be signed using a signature code. A signature code may alternatively be referred to as a nonce. The signature code of a data block is used to help detect tampering of the data block according to the blockchain protocol 130. For example, a data block signature code may be considered valid according to the blockchain protocol 130 when a hash value of a combination of the signature code and the data elements in the data block contains a hash section with a predefined hash pattern. The predefined hash pattern may be specified by the blockchain protocol (e.g., a predefined number of leading zeros at the beginning of the hash value). Thus, the signature code for a block may be calculated by solving a difficult cryptographic problem. In the example implementation above, the signature code may be calculated such that the hash value of the combination of the calculated signature code and the data elements complies with the signature protocol. For example, signature code 1 for block 304 is calculated such that the SHA256 hashing of the combination of the signature code 1, the data elements T10, T11, and T12 of the data block 304 is compatible with the block signature protocol, e.g., leading by the predefined number of zeros. Any tempering of data in a signed block will results in a hash value for the block that is incompatible with the signature protocol.

The blockchain 300 may be created by appending data blocks one at a time. Specifically, the encrypted (or digitally signed) data elements from various nodes of the blockchain system may be broadcasted to the blockchain system. These encrypted data elements may then be collected into a data block for storage into the blockchain. The blockchain protocol 130 may specify a consensus algorithm or mechanism. The consensus algorithm may govern how new data elements are verified, how a new data block is assembled from the verified new data elements, and how the new block is broadcasted to the blockchain nodes, checked and accepted into the blockchain.

In one example consensus algorithm, data elements submitted from the nodes may be collected periodically, e.g., every 10 minutes or roughly a time period needed for solving a block signature code by the blockchain nodes. Further, various nodes may participate in verifying these data elements according to data element verification rules specified by the blockchain protocol 130 (e.g., the data elements are digitally signed, a financial transaction contained in the data element is valid in that the payer has enough balance), to assemble the data elements into a block, to calculate a signature code for the block, and to broadcast the new block to the blockchain system for acceptance. In one implementation, the first node that broadcasts an acceptable block will be responsible for inserting its block into the blockchain. The copies of the blockchain in various nodes are updated with the new block. This particular algorithm for having to solve the signature code, sometimes referred as "proof of work" is only one example of possible consensus algorithms. Other consensus algorithms, such as "proof of stake", may be used by the blockchain notes for verifying and creating new data blocks. The insertion of a data element embedded in its data block into the blockchain is alternatively referred to as linking the data element in with the blockchain.

The functions of the blockchain system, e.g., encrypting and submitting data elements, consensus functions (including verification of data elements, calculation of signature code, and assembly of a new data block), and storing local copy of the blockchain, may be performed by various nodes. The nodes that participate in the consensus algorithm, for example, may be referred to as miners. As described previously, a node, when participating into the blockchain system, may decide the subset of functions that the node may perform by installing a corresponding software stack. A full function node, for example, may perform all the functions discussed above. A node of limited functions, however, may only perform the chosen set of functions. Some nodes, for example, may only participate in encrypting and submitting data elements into the blockchain.

As discussed above, data elements in a data block of the blockchain may be of any type of data that a participating entity wishes to store in the blockchain, including the special type of executable data elements (or smart contracts). The blockchain protocol 130 (130 of FIG. 1) may prescribe mechanisms and interfaces for invoking all or part of the executable computer instructions in an executable data element from other data elements. For example, an executable data element may include sections of instructions that may be independently invoked. Each of these executable data elements may be identifiable by an ID and each section of instructions within an executable data element may further be identified by a section ID.

The execution of all or a section of an executable data element may be invoked in various ways and under various timing. In one example implementation, the blockchain protocol 130 may provide a mechanism for invoking the execution of a section of instructions in an executable data element from another data element when the other data element is inserted into a new data block and the new data block is verified and appended to the blockchain by one of the nodes. An invocation interface may be provided in the invoking data element in accordance with the blockchain protocol 130 for specifying, e.g., the ID of the executable data element, the ID of the specific section of instructions within the executable data element to be executed, and parameters to be passed to the executable instructions.

The blockchain system described above in FIGS. 1-3 may be used in various applications. For example, multiple participating entities may use the blockchain system for sharing proprietary information stored in the blockchain. For example, collaborating semiconductor circuit manufacturers may use the blockchain system to share designs and layouts. For another example, two collaborating hospitals may use the blockchain system to share patient activities and other information. Information may be categorized by the hospitals as, for example, patient activities of different types, e.g., patient actives and interactions with different departments (internal medicine, cardiology, bill pay, etc.). Each individual activity data may be proprietary and encoded by the hospitals according to a format and encryption formula agreed upon between the collaborating hospitals and used as a data payload in a data element. This data element may then be further encrypted using appropriate public key and stored in the blockchain. As such, proprietary information in such a data element is only sharable between the collaborating hospitals but not with other general participating entities in the blockchain. Specifically, while the public key may be used by other participating entities to decrypt the data element in the blockchain to obtain the encapsulated data payload, such data payload is proprietary and can only be further decrypted by the collaborating hospitals.

In the context of information sharing in blockchain above and in many other blockchain applications, a participating entity may desire to query the blockchain for information. For example, one of the collaborating hospitals may need to search for patient activities in a particular department of the other hospital. For a typical blockchain system, it is normally straightforward to fetch a particular data element from the blockchain if the data ID and/or the block ID for the data block containing the particular data element is known and is used as a query key. The returned data element may then be decrypted using appropriate public key, and if the data payload is proprietary it may be further decrypted by the querying entity.

However, in some applications, the data ID and/or the block ID for the data element to be queried may be unknown. For example, in the information sharing application between two collaborating hospitals discussed above, the first hospital may desire to find out visits by a particular patient to a particular department of the second hospital. The key that the first hospital may use to query into the blockchain may be the identity of the particular department of the hospital and the name or public key for the particular patient. Because block IDs and data IDs for data elements associated with these patient visits are unknown, the blockchain may need to be traversed from beginning to end for decrypting and identifying these desired data elements stored in the blockchain. Because the blockchain can become excessively large, such a query process in the blockchain may be time-consuming and inefficient.

In some other implementations, information about the entire collection of data elements in the blockchain may be extracted and tracked as the data blocks are being appended to the blockchain in the form of a separate database such as a relational database that may be queried more efficiently using traditional database query processes. However, such an approach requires additional storage space in blockchain nodes for maintaining and synchronizing the separate database. Such a database is duplicative of information contained already in the blockchain and usually consumes a large storage space.

In one example implementation according to the current disclosure, auxiliary indexes of a subset of data elements in the blockchain for purposes of efficient information retrieval from the blockchain may be created and updated by one entity or by collaborating entities. The subset of data elements may include data elements of interest to the entity or collaborating entities. For example, the auxiliary indexes may be established by two collaborating hospitals who wish to share information for data elements relating to patient activities in these collaborating hospitals. Each auxiliary index may correspond to a particular type of patient activities. The auxiliary indexes may be created and updated via execution of instructions in executable data elements submitted into the blockchain by the collaborating hospitals. The execution of the executable data elements for creating and updating an auxiliary index may be invoked when each of the subset of data elements of a particular type is inserted into the blockchain. Further, the auxiliary indexes may be maintained in databases separate from the blockchain. The auxiliary indexes may be accessed by the two hospitals to facilitate retrieval of information pertaining to the subset of data elements from the blockchain without having to traverse the entire blockchain.

Figure 4:
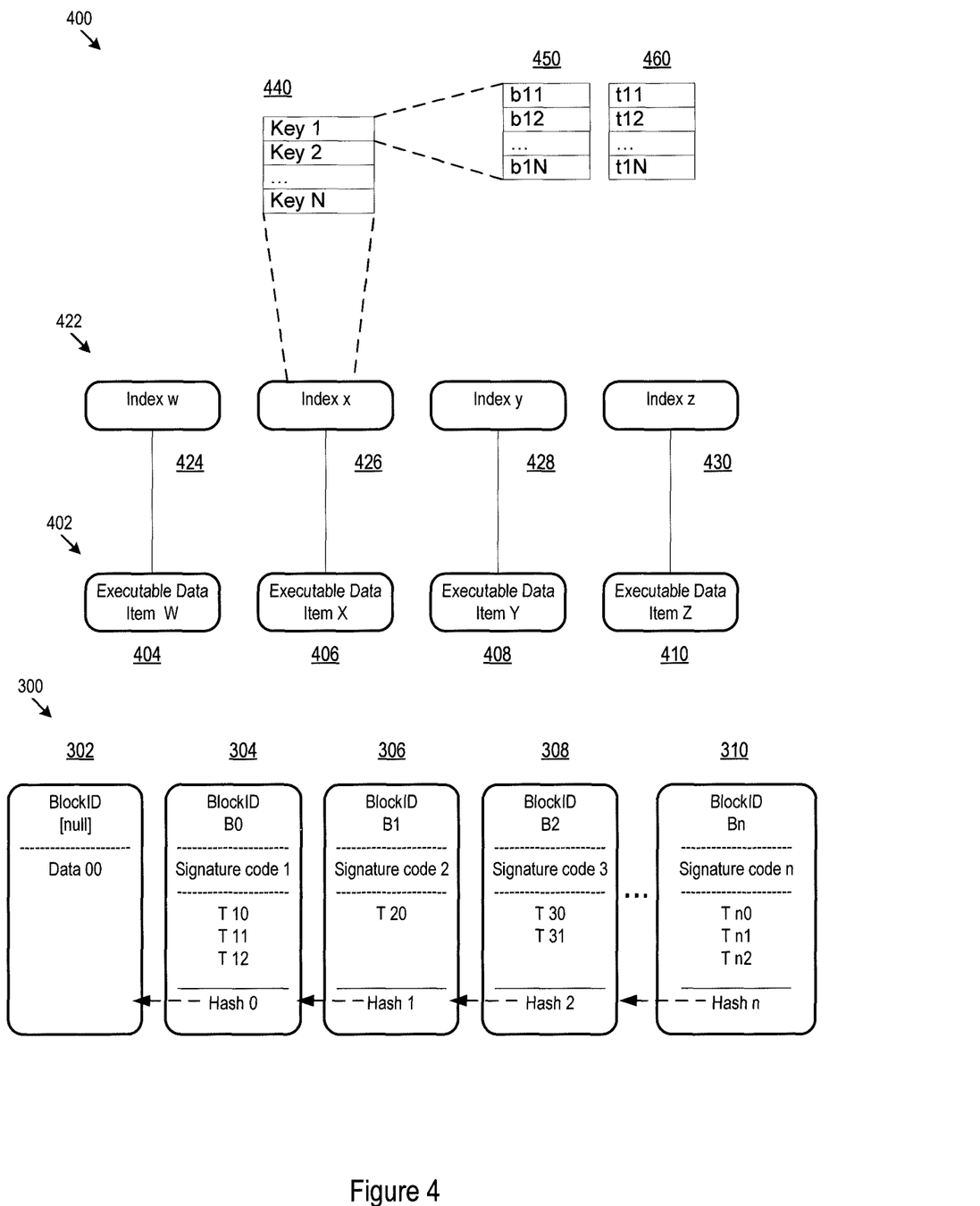
FIG. 4 shows an auxiliary index system for data elements in a blockchain.

FIG. 4 illustrates in more detail an example implementation 400 of such auxiliary indexes for information query in the blockchain. Specifically, executable data elements 402 may be inserted into the blockchain following a normal course of submitting data elements according to the blockchain protocol 130. For example, these executable data elements may be agreed upon by entities who wish to share information. These executable data elements may be executed to build, maintain, update, and query auxiliary indexes 422 for facilitating information retrieval by the entities. Each executable data element may correspond to one auxiliary index (e.g., 404→424, 406→426, 408→428, 410→430). Alternatively, an executable data element may contain multiple sections of instructions and each section of instructions may correspond to one of the auxiliary indexes 422.

Each executable data element and the corresponding auxiliary index may be related to one particular type of data elements in the blockchain. In accordance, the auxiliary indexes 422 may each be identifiable as being associated with a type of data elements. In the context of information sharing application between two collaborating hospitals, for example, auxiliary index 424 may correspond to all patient activities with the cardiology departments of the hospitals while index 426 may be related to all patient activities with the surgical departments of the hospitals, and index 428 may correspond to payment made to the hospitals by the patients.

In one implementation, each auxiliary index, such as auxiliary index 426, may include public keys for entities involved in the corresponding type of data elements as shown by 440. Further, each index may include block IDs and/or data ID of the corresponding type of data elements. In the context of information sharing application between two collaborating hospitals, the auxiliary index 426, for example, may include multiple entries. Each entry may corresponds to a data element related to a patient activity in, for example, the surgical department of the hospitals. Each entry may include a public key or other identifier for a patient and the block ID (e.g., b11-b1N) and data ID (e.g., t11-t1N) for the data element, as shown by 440, 450, and 460 of FIG. 5.

Figure 5:
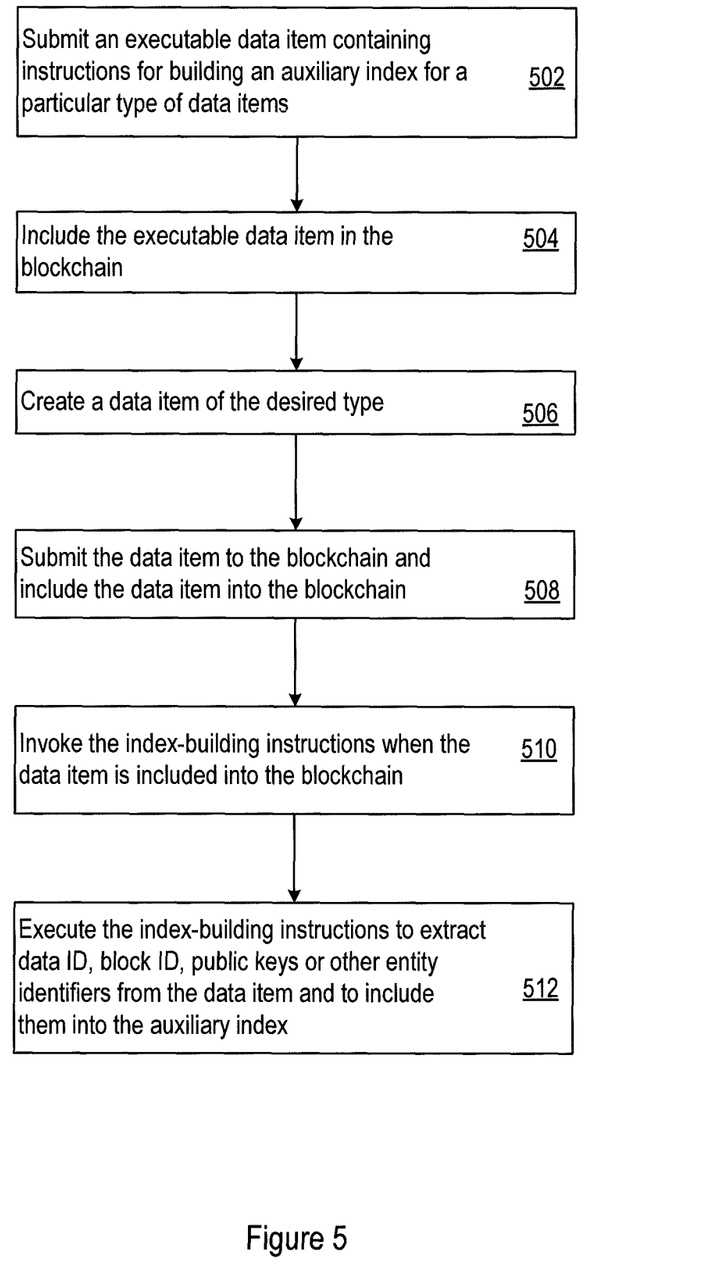
FIG. 5 shows a logic flow for creating and updating an auxiliary index.

FIG. 5 illustrates a logic flow for creating an auxiliary index for a particular type of data elements. An entity may first submit an executable data element containing instructions for building the auxiliary index for the particular type of data elements to the blockchain (502). The executable data element may then be included into the blockchain by a miner node via the consensus process (504). Once the executable data element is in place in the blockchain, the auxiliary index for the particular type of data elements may then be build. Specifically, a data element of the particular type may be created (506). The data element of the particular type may then be submitted to the blockchain and included into the blockchain by a miner node via the consensus process (508). Upon including the data element of the particular type in the blockchain, the instructions in the executable data element for building the auxiliary index for data elements of the particular type may be invoked and automatically executed (510). This invocation may be performed by including code interface in the data element of the particular type for automatically invoking the instructions in the executable data element when the data element of the particular type is committed to the blockchain. The code interface may be specified by the blockchain protocol 130. Alternatively, the invocation of the instruction in the executable data element for building the auxiliary index may be made in the application layer of a node. By executing the auxiliary index-building instruction, the data ID, block ID, public keys or other entity identifiers, etc., may be extracted from the data element of the particular type and included in the auxiliary index of the particular type of data elements (512).

Figure 6:
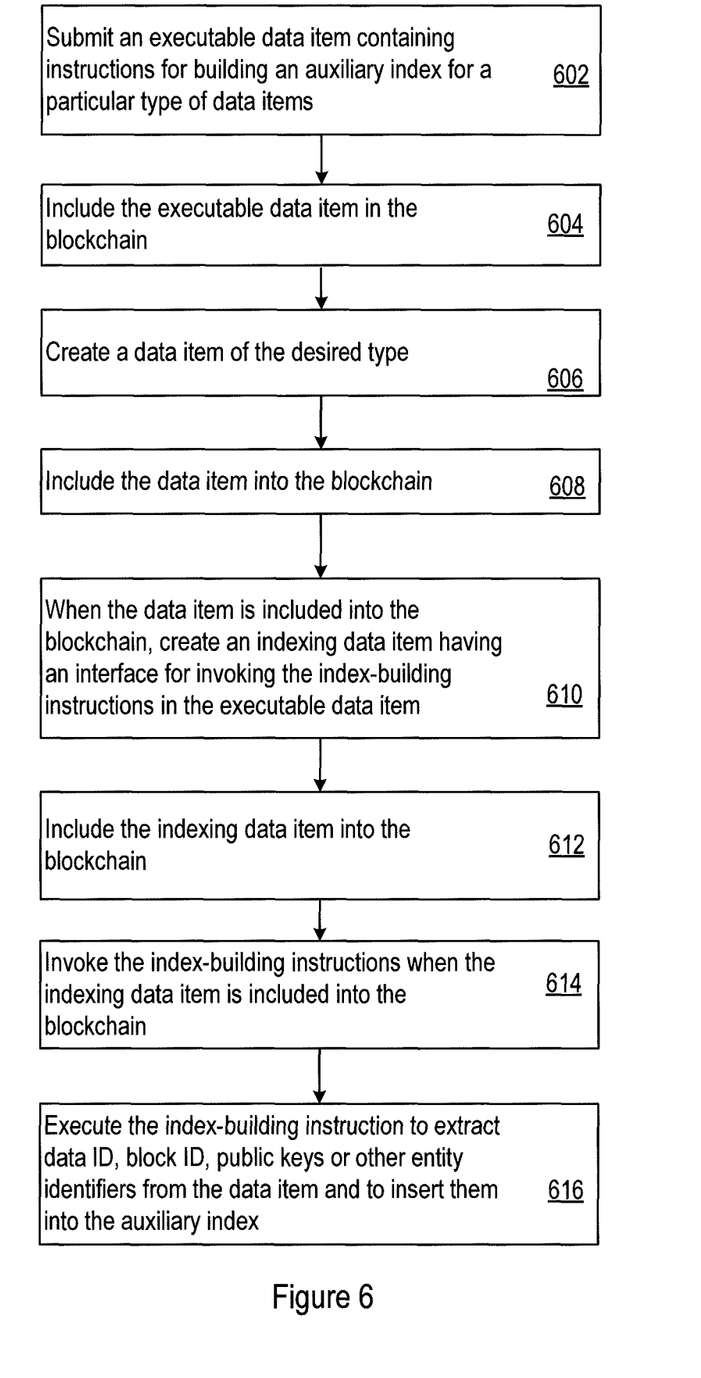
FIG. 6 shows another logic flow for creating and updating an auxiliary index.

FIG. 6 illustrates another alternative logic flow for creation of an auxiliary index for a particular type of data elements. Again, an entity may first submit an executable data element containing instructions for building the auxiliary index for the particular type of data elements to the blockchain (602). The executable data element may then be included into the blockchain by a miner node via the consensus process (604). Once the executable data element is in place, auxiliary index for the particular type of data elements may then be build. Specifically, a data element of the particular type may be created (606) and included into the blockchain by a minor node via the consensus process (608). Upon including the data element into the blockchain, a corresponding indexing data element (alternatively referred to as indexing control data element) having an interface for invoking the index-building instructions in the executable data time may be created (610). The creation of the indexing data element may be automatically initiated by a code interface embedded in the data element. Alternatively, application layer in blockchain nodes may create the indexing data element after detecting that the corresponding data element of the particular type has been committed into the blockchain. This indexing data element is just like a regular data element but contains the interface for invoking the instructions in the executable data element for building the auxiliary index for data elements of the particular type. The indexing data element is then included into the blockchain by a miner node via the consensus process (612). Upon including the indexing data element in the blockchain, the instructions in the executable data element for building the auxiliary index for data elements of the particular type may be invoked and automatically executed (614). By executing the auxiliary index-building instruction, the data ID, block ID, public keys or other entity identifiers, etc., may be extracted from the data element of the particular type and included in the auxiliary index of the particular type of data elements (616).

Figure 7:
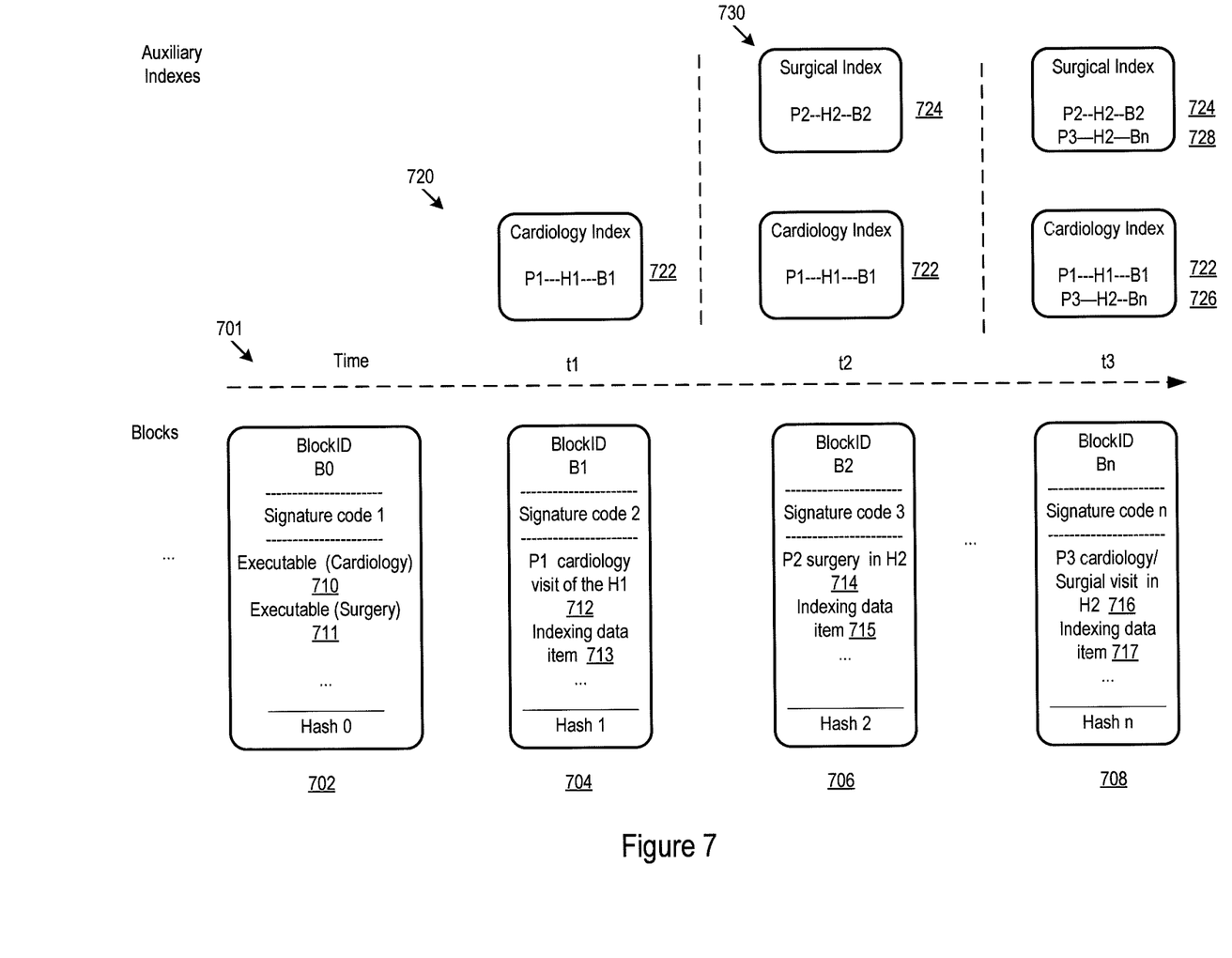
FIG. 7 shows a timeline for creating and updating auxiliary indexes.

FIG. 7 shows an example timeline for creating auxiliary indexes of data elements of particular types. Specifically, FIG. 7 shows a time line 701 with three time marks t1, t2, and t3, where t1<t2<t3. Prior to time t1, entities such as two collaborating hospitals H1 and H2 have created various executable data elements for building auxiliary indexes for particular types of data elements. These executable data elements may be included in, for example, block 702). In FIG. 7, two separate executable data elements 710, and 711 are included in block 702 for building auxiliary indexes for patient visit of cardiology department and surgical department of the hospitals, respectively. Alternatively, the two executable data elements may resides in different data blocks. Alternatively, the two separate executable data elements may be implemented as a single executable data element containing two identifiable sections of instructions, one section for building auxiliary index for patient visits of the cardiology departments of the hospitals, and the other section for building auxiliary index for patient visits of the surgical departments of the hospitals.

At time t1, data block 704 is verified by a miner node via the consensus process and accepted into the blockchain. Among various data elements, data block 704 contains a data element 712 describing visit of the cardiology department of H1 by a first patient P1. Data element 712 may directly invoke instructions in the corresponding executable data element 710 in block 702 to create entry 722 in the cardiology auxiliary index 720. Alternatively, data element 712 may create indexing data element 713 which invokes instructions in the executable data element 710 to create entry 722 in the cardiology auxiliary index 720. Thus, after time t1, the cardiology auxiliary index 720 contains one entry and the surgical index 730 is empty. Data element 712 and indexing data element 713 do not need be in the same data block. For example, the indexing data element 713 may be in a later data block, e.g., a data block that immediately follows the data block holding the data element 712.

At time t2, data block 706 is verified by a miner node via the consensus process and accepted into the blockchain. Among various data elements, data block 706 contains a data element 714 describing visit of the surgical department of H2 by a second patient P2. Again, data element 714 may directly invoke instructions in the corresponding executable data element 711 in block 702 to create entry 724 in the surgery auxiliary index 730. Alternatively, data element 714 may create indexing data element 715 which invokes instructions in the executable data element 711 to create entry 724 in the surgery auxiliary index 730. Thus, after time t2, the number of entries in the cardiology auxiliary index 720 remains at one and the surgical auxiliary index 730 contains one entry.

At time t3, data block 708 is verified by a miner node via the consensus process and accepted into the blockchain. Among various data elements, data block 708 contains a data element 716 describing visits of the cardiology and surgical departments of H2 by a third patient P3. Data element 716 may directly invoke instructions in both the executable data elements 710 and 711 in block 702 to create entry 726 in the cardiology auxiliary index 720 and entry 728 in the surgery auxiliary index 730. Alternatively, data element 716 may create indexing data element 717 which invokes instructions in the executable data element 710 and 711 to create entry 726 in the cardiology auxiliary index 720 and entry 728 in the surgery auxiliary index 730. Thus, after time t3, the cardiology auxiliary index 720 contains two entries and the surgery auxiliary index 730 contains two entries.

In another example context of information sharing between two collaborating semiconductor manufacturers, the semiconductor manufacturers may store circuit layouts designed for various device manufacturers (customers of the semiconductor manufacturers) in the blockchain. The circuits may be classified into different types, e.g., analogue power circuits, digital micro-controller circuits, digital signal processor circuits, encryption/decryption circuits, video coding circuits, as just a few examples. In keeping with the principles discussed above, the semiconductor manufacturers may establish various executable data elements each for one type of circuits for building auxiliary indexes for data elements containing these types of circuits. As such, auxiliary index 720 of FIG. 7 for example, may be built for data elements containing analogue power circuits while index 730 may be built for data elements containing digital signal processor circuits. Correspondingly, the executable data elements 710 and 711 may contain instructions for building the auxiliary indexes for analogue power circuits and digital signal processor circuits. Furthermore, the data element 712 may contain an analogue power circuit submitted by the first semiconductor manufacturer for a first device manufacturer and the corresponding indexing data element 713 may be used for invoking instructions in the executable data element 710 to build auxiliary index 720. The data element 714 may contain a digital signal processor circuit submitted by the second semiconductor manufacturer for a second device manufacturer and the corresponding indexing data element 715 may be used to invoke instructions in the executable data element 711 for building the auxiliary index 730 for digital signal processor circuits. Similarly, data element 716 may contain both an analogue power circuit and a digital signal processor circuit submitted by the second semiconductor manufacturer for a third device manufacturer and the corresponding indexing data element 717 may be used to invoke instructions in both executable data elements 710 and 711 for building the auxiliary indexes 720 and 730 for the analogue power circuits and digital signal processor circuits. As such, the illustration in FIG. 7 applies in the context of information sharing between collaborating semiconductor manufacturers and many other application contexts.

The auxiliary indexes 720 and 730 may be stored separately from the blockchain. They may be stored locally at the nodes belonging to the hospitals. Alternatively, they may be stored in a cloud storage space. Access to the auxiliary indexes may be provided to the hospitals and to entities that the hospitals agree to grant access. The auxiliary indexes may be stored in a form of a relational database or any other forms. Alternatively, the auxiliary indexes may be maintained in any other forms and may be optimized for queries. For example, the auxiliary indexes may be stored as data structures such as binary sort trees and may be optimized using optimization algorithms involving hashes. Because the auxiliary indexes do not need to be written back into the blockchain, the validation and consensus process of the main blockchain is not affected. As such, all the consensus mechanisms for traditional blockchain stay intact and these consensus mechanisms may be further developed independent of the development of the mechanisms for building the auxiliary indexes.

Further, the instructions for building the auxiliary indexes may be developed by individual or collaborating entities in the application layer in a blockchain node. The lower layers of the blockchain software stack only need to provide mechanisms or interfaces for function calls to executable data elements (smart contracts) in the blockchain from another data element in the blockchain. As such, the process for building and updating auxiliary indexes described above does not require any modification of the basic software stack at a blockchain node.

Because the auxiliary indexes are created and updated according to FIG. 5 and FIG. 6 by encapsulating the instructions for building the auxiliary indexes in executable data elements in the main blockchain, the integrity of the updates of the auxiliary indexes is assured by the consensus mechanisms for the main blockchain. Further, the auxiliary indexes contains only identifier information for entities, data elements, and blocks. Actual data only reside in the main blockchain and is protected from tampering. As such, any tampering of the auxiliary indexes (which may reside outside of the main blockchain and thus are not protected by the tampering detection mechanism of the main blockchain) at most leads to wrong identification of data elements or missed data elements when the auxiliary indexes are queried for data and block IDs (see below for a detailed description of the query process). The actual data elements in the main blockchain would not be compromised.

There may be a time delay between when a data element of a particular type is committed to the blockchain and when the auxiliary index for the particular type of data element is updated. Because of such a delay, the data element and the corresponding indexing data element of FIGS. 6 and 7 (such as the data element 712 and corresponding indexing data element 713) may reside in different blocks. However, because the instructions for building an auxiliary index are executed after the data element is committed to the main blockchain, any entry in the auxiliary index would correspond to a data element that has already been included in the main blockchain. The instructions in the executable data elements for building the auxiliary indexes may further be constructed to guarantee that the auxiliary indexes are not updated before the commitment of the corresponding data elements into the blockchain across the blockchain nodes. Alternatively, the application layer in a blockchain node may ensure that submission of an indexing data element to the blockchain is made after that the corresponding data element is committed into the blockchain (see 610 of FIG. 6).

Figure 8:
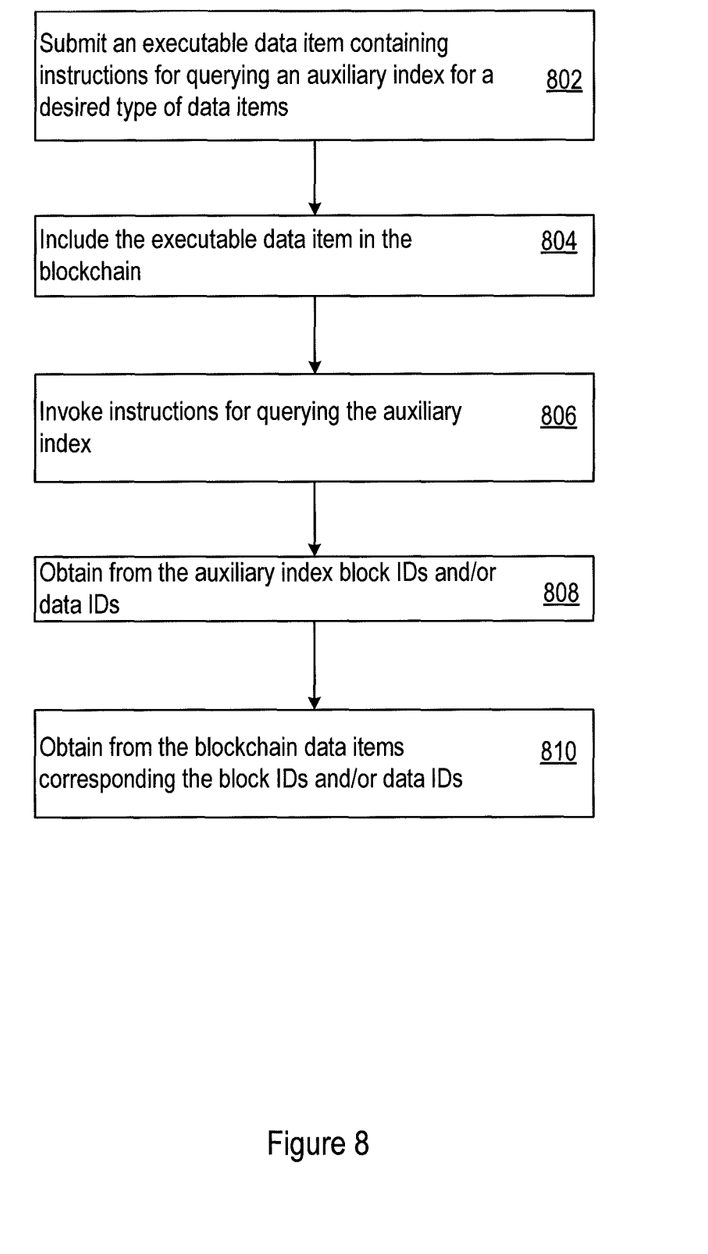
FIG. 8 illustrates a logic flow for querying an auxiliary index and blockchain for data elements.

FIG. 8 shows a logic flow for querying the blockchain for information via an auxiliary index established for a particular type of data elements. An entity, such as one of the collaborating hospitals may submit an executable data element containing instructions for querying an auxiliary index for a desired type of data elements (802). This executable data element may be integrated with the executable data element 502 of FIG. 5 of 602 of FIG. 6. Specifically, the executable data element may contain an instruction section for creating the auxiliary index for the particular type of data elements and an instruction section for querying the auxiliary index. Alternatively, the executable data element 802 of FIG. 8 may be separate from the executable data element 502 of FIG. 5 or 602 of FIG. 6.

Continuing in FIG. 8, the executable data element for querying information about a particular type of data elements may then be included in the blockchain by a miner node via the consensus process (804). Once the executable data element is in place, the entity may query the auxiliary index by directly invoking the instruction for querying the auxiliary index for the particular type of data elements (806). For example, the query instructions may be executed to query the auxiliary index for the particular type of data elements using a patient name or public key. This direct query may be independent of the blockchain. For example, the auxiliary index may be stored in a database outside of the blockchain and the query may be made directly by the entity from its blockchain node or from anywhere outside the blockchain node. The query to the auxiliary index may return an output that contains block IDs and/or data element IDs that match the query criteria (808). The entity may then use the returned block IDs and/or data IDs to obtain the corresponding data elements from the blockchain, decrypt these data elements using public keys, and further decode the data payload to obtain the desired information (810).

Figure 9:
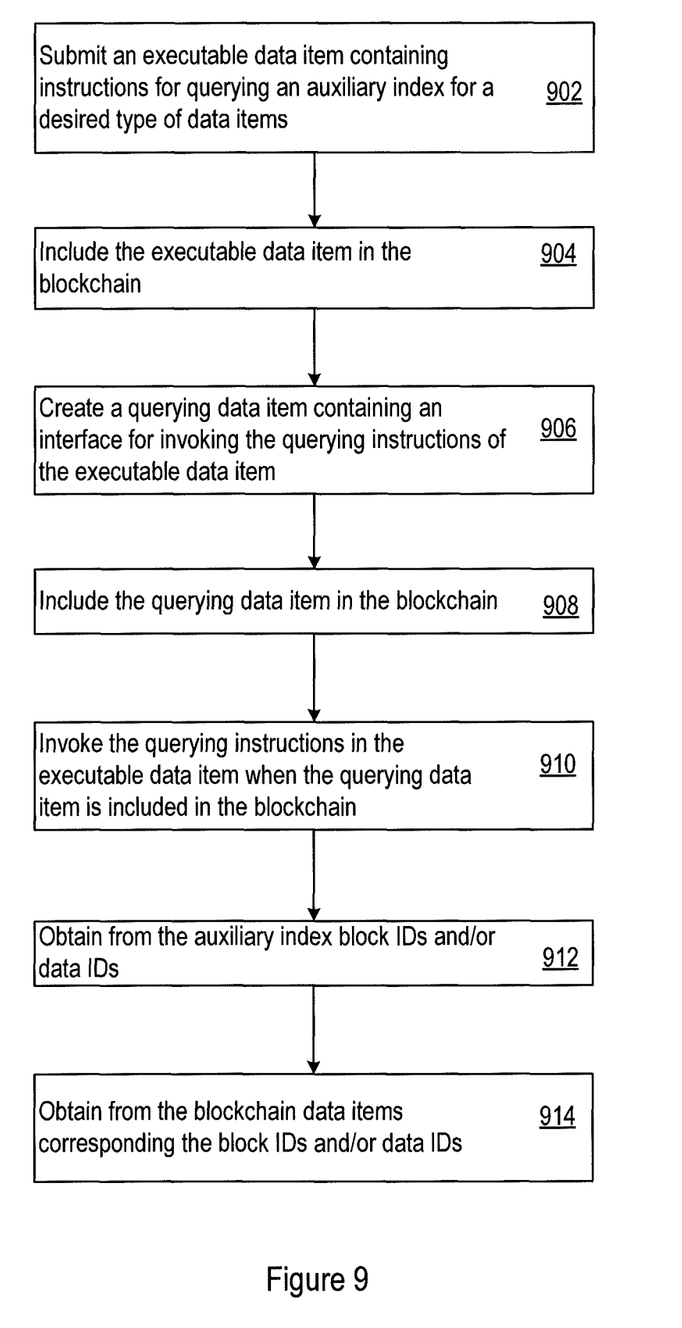
FIG. 9 shows another logic flow for querying an auxiliary index and blockchain for data elements.

FIG. 9 shows another alternative logic flow for querying the blockchain for information via an auxiliary index established for a particular type of data elements. An entity, such as one of the collaborating hospitals may submit an executable data element containing instructions for querying an auxiliary index for a desired type of data elements (902). Again, this executable data element may be integrated with the executable data element 502 of FIG. 5 of 602 of FIG. 6. The executable data element for querying information about a particular type of data elements may then be included in the blockchain by a miner node via the consensus process (904). Once the executable data element is in place, the entity may query the auxiliary index by using a querying data element containing an interface for invoking the querying instructions of the executable data element (906). The querying data element may be first included in the blockchain by a minor node using the consensus process (908). Upon including the querying data element into the blockchain, the instructions for querying the auxiliary index for the particular type of data elements in the executable data element may be automatically invoked (910). For example, the querying instructions may be executed to query the auxiliary index for the particular type of data elements using a patient name or public key. The query to the auxiliary index may return an output that contains block IDs and/or data element IDs that match the query criteria (912). The entity may then use the block IDs and/or data IDs to obtain the corresponding data elements from the blockchain, decrypt these data elements using public keys, and further decode the data payload to obtain the desired information (914).

The disclosure above thus provides a mechanism for building auxiliary indexes of subsets of data elements in a blockchain. The auxiliary indexes may be established and updated at the application layer without affected the basic software stack of blockchain nodes. The auxiliary indexes may be maintained outside of the blockchain. The auxiliary indexes facilitate efficient query of data elements in the blockchain, particularly in the context of information sharing in a blockchain system. Although the disclosure above are made mostly in the context of blockchain, the underlying principles applies to any decentralized secure data processing and storage systems.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
a memory configured to store:
 a data storage layer comprising linked data blocks containing data elements; and
 an index structure comprising index entries for data elements of a predefined type in the linked data blocks; and
injection circuitry in communication with the memory, the injection circuitry configured to respond to a linkage of a new data block comprising a new data element to the linked data blocks in the data storage layer by:
 determining that the new data element is of the predefined type;
 generating an index entry for the new data element, the index entry comprising a location reference within the data storage layer for the new data element; and
 inserting the index entry into the index structure.

2. The system of claim 1, where the data storage layer is present within a blockchain system node, and the linked data blocks constitute a copy of a blockchain.

3. The system of claim 1, where the data elements comprise an executable data element containing instructions for generating the index entry and inserting the index entry into the index structure.

4. The system of claim 3, where the injection circuitry is configured to invoke the instructions in the executable data element from the new data element to generate the index entry and insert the index entry into the index structure after the new data element is linked in with the linked data blocks in the data storage layer.

5. The system of claim 3, where:
the injection circuitry is further configured to generate an indexing control data element for the new data element and link the indexing control data element to the linked data blocks in the data storage layer; and
the injection circuitry is configured to invoke the instructions in the executable data element from the indexing control element after the new data element and the indexing control element are linked in with the data blocks in the data storage layer.

6. The system of claim 1, where the index entry further comprises a data characteristic describing the new data element of the predefined type.

7. The system of claim 6, where the location reference comprises a data block identifier, a data element identifier, or both.

8. The system of claim 1, where the index structure is stored outside the linked data blocks in the data storage layer.

9. The system of claim 1, further comprising a query circuitry, the query circuitry configured to:
receive a query for the new data element among data elements of the predefined type;
identify the index structure associated with the data elements of the predefined type;
retrieve the index entry from the index structure; and
return the location reference obtained from the index entry in response to the query.

10. The system of claim 9, where the location reference comprises the location reference within the data storage layer for the data elements of the predefined type.

11. The system of claim 9, where the data elements comprise an executable data element containing instructions for identifying the index structure and retrieving the index entry.

12. The system of claim 11, where the query is embedded in a querying data element and the query circuitry is further configured to invoke the instructions in the executable data element from the querying data element after the querying data element is linked in with the linked data blocks.

13. A method comprising:
receiving an executable data element containing instructions for generating index entries for data elements of a predefined type and inserting the generated index entries into an index structure for the predefined type;
linking the executable data element in with a linked data blocks in a data storage layer;
receiving a new data element of the predefined type;
linking the new data element in with the linked data blocks in the storage layer; and
invoking the instructions in the executable data element linked in with the linked data blocks to generate an index entry for the new data element and insert the index entry into the index structure after the linking of the new data element with the linked data blocks, where the index entry comprises a location reference within the data storage layer for the new data element.

14. The method of claim 13, where the instructions in the executable data element are invoked from the new data element.

15. The method of claim 13, further comprising:
generating an indexing control data element for the new data element; and
linking the indexing control data element in with the linked data blocks in the storage layer, and where the instructions in the executable data element are invoked from the indexing control data element.

16. The method of claim 13, where the index structure is stored outside of the linked data blocks in the data storage layer.

17. The method of claim 13, further comprising
receiving a query for the new data element among data elements of the predefined type;
identifying the index structure associated with the predefined type;
retrieving the index entry from the index structure; and
return the location reference obtained from the index entry in response to the query.

18. The method of claim 17, where the instructions in the executable data element further comprise instructions for the identification of the index structure and the retrieval of the index entry.

19. The method of claim 18, where the query is embedded in a querying data element, the method further comprising:
linking the query data element in with the linked data blocks in the storage layer; and
invoking the instructions in the executable data element for identifying the index structure and retrieving the index entry from the querying data element after the querying data element is linked in with the linked data blocks in the storage layer.

20. A system comprising:
a memory configured to store:
a data storage layer comprising linked data blocks containing data elements; and
an index structure comprising index entries for data elements of a predefined type in the linked data blocks; and
injection circuitry in communication with the memory, the injection circuitry configured to:
link an executable data element containing instructions for generating index entries and insert the index entries for data elements of the predefined type in with the linked data blocks in the data storage layer;
receive a new data element;
determine that the new data element is of the predefined type;
generate an indexing control data element for the new data element of the predefined type;
link the new data element in with the linked data blocks in the data storage layer;
link the indexing control data element in with the linked data blocks in the data storage layer; and
generate an index entry for the new data element and inserting the index entry into the index structure by invoking the instructions in the executable data element from the indexing control data element after the new data element and the indexing control data element is linked in with the linked data blocks in the data storage layer,
where the index entry comprises a location reference within the data storage layer for the new data element.

* * * * *